US009449568B2

(12) United States Patent
Hu

(10) Patent No.: US 9,449,568 B2
(45) Date of Patent: Sep. 20, 2016

(54) LIQUID CRYSTAL DISPLAY MONITOR AND SOURCE DRIVER AND CONTROL METHOD THEREOF

(71) Applicant: NOVATEK Microelectronics Corp., Hsin-Chu (TW)

(72) Inventor: Jen-Chieh Hu, Kaohsiung (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 400 days.

(21) Appl. No.: 13/863,388

(22) Filed: Apr. 16, 2013

(65) Prior Publication Data

US 2014/0132580 A1 May 15, 2014

(30) Foreign Application Priority Data

Nov. 14, 2012 (TW) ............................ 101142431 A

(51) Int. Cl.

*G09G 3/36* (2006.01)
*G09G 3/00* (2006.01)
*G02F 1/1362* (2006.01)

(52) U.S. Cl.

CPC .......... *G09G 3/3614* (2013.01); *G09G 3/3688* (2013.01); *G09G 2320/0209* (2013.01)

(58) Field of Classification Search

CPC .................. G09G 3/3614; G09G 2320/0295; G02F 1/13306

USPC ...... 345/87, 89, 98, 100, 104, 211, 214, 690

See application file for complete search history.

(56) References Cited

U.S. PATENT DOCUMENTS

| | | | | |
|---|---|---|---|---|
| 7,102,604 B2 | | 9/2006 | Hong | |
| 2003/0038794 A1* | | 2/2003 | Nukiyama | G09G 3/006 345/213 |
| 2004/0239602 A1* | | 12/2004 | Kim | G09G 3/3611 345/87 |
| 2005/0078074 A1* | | 4/2005 | Morita | G09G 3/3614 345/96 |
| 2006/0022927 A1* | | 2/2006 | Woo et al. | 345/89 |
| 2007/0030236 A1 | | 2/2007 | Kim | |

(Continued)

FOREIGN PATENT DOCUMENTS

| | | | |
|---|---|---|---|
| KR | 2007074736 * | 7/2007 | G09G 3/3611 |
| TW | 200901143 | 1/2009 | |

(Continued)

OTHER PUBLICATIONS

Liquid Crystal Display and Driving Method Thereof. Jin-U Park, Jul. 18, 2007, Korean Intellectual Property Office.*

*Primary Examiner* — Lin Li
(74) *Attorney, Agent, or Firm* — Winston Hsu; Scott Margo

(57) ABSTRACT

A liquid crystal display (LCD) monitor including an LCD display panel for displaying a frame, a timing controller for generating a polarity control signal and a latch signal, and a driving circuit including a plurality of source drivers, each of the plurality of source drivers including a comparison unit for comparing a common electrode voltage with a first and a second reference voltages to generate a comparison result, an enabling unit for generating an enabling signal according to the comparison result, a source driving signal and a reset signal, a horizontal dot inversion control unit for generating a horizontal dot inversion control signal according to the enabling signal, and a polarity control unit for generating a polarity inversion control signal and the reset signal according to the enabling signal, the polarity control signal and the latch signal.

34 Claims, 13 Drawing Sheets

(56) References Cited

U.S. PATENT DOCUMENTS

2008/0012817 A1* 1/2008 Chen et al. .................... 345/100
2008/0211835 A1* 9/2008 Enjou .................. G09G 3/3688 345/690
2009/0219307 A1* 9/2009 Yaguma ............... G09G 3/3655 345/690
2010/0156885 A1* 6/2010 Cho ....................... G09G 3/006 345/214
2010/0289828 A1* 11/2010 Lee ...................... G09G 3/3614 345/690
2012/0162556 A1* 6/2012 Chen ................. G02F 1/136213 349/38
2013/0127930 A1* 5/2013 Nishio ................. G09G 3/3688 345/690

FOREIGN PATENT DOCUMENTS

TW I339378 3/2011
TW I370923 8/2012
WO 2012014564 A1 2/2012

* cited by examiner

| | | | | | | | |
|---|---|---|---|---|---|---|---|
| − | − | + | + | − | − | + | + |
| − | + | + | − | − | + | + | − |
| − | − | + | + | − | − | + | + |
| − | + | + | − | − | + | + | − |
| − | − | + | + | − | − | + | + |
| − | + | + | − | − | + | + | − |
| − | − | + | + | − | − | + | + |
| − | + | + | − | − | + | + | − |

FIG. 9A

| | | | | | | | |
|---|---|---|---|---|---|---|---|
| + | − | − | + | + | − | − | + |
| + | + | − | − | + | + | − | − |
| − | + | + | − | − | + | + | − |
| − | − | + | + | − | − | + | + |
| + | − | − | + | + | − | − | + |
| + | + | − | − | + | + | − | − |
| − | + | + | − | − | + | + | − |
| − | − | + | + | − | − | + | + |

FIG. 9B

| | | | | | | | |
|---|---|---|---|---|---|---|---|
| + | − | − | + | + | − | − | + |
| − | − | + | + | − | − | + | + |
| + | − | − | + | + | − | − | + |
| + | + | − | − | + | + | − | − |
| − | + | + | − | − | + | + | − |
| + | + | − | − | + | + | − | − |
| + | − | − | + | + | − | − | + |
| − | − | + | + | − | − | + | + |

FIG. 9C

| | | | | | | | |
|---|---|---|---|---|---|---|---|
| + | − | − | + | + | − | − | + |
| − | − | + | + | − | − | + | + |
| − | + | + | − | − | + | + | − |
| + | + | − | − | + | + | − | − |
| − | + | + | − | − | + | + | − |
| − | − | + | + | − | − | + | + |
| + | − | − | + | + | − | − | + |
| + | + | − | − | + | + | − | − |

FIG. 9D

LIQUID CRYSTAL DISPLAY MONITOR AND SOURCE DRIVER AND CONTROL METHOD THEREOF

BACKGROUND OF THE INVENTION

1. Field of the Invention

The present invention relates to a liquid crystal display monitor, a source driver and a control method thereof, and more particularly, to a liquid crystal display monitor, a source driver and a control method thereof capable of timely switching a driving method by detecting a common electrode voltage.

2. Description of the Prior Art

Since liquid crystal display monitors (LCD monitors) have the advantages of lightweight, low power consumption and free of radiation emission, they have been widely used in information products such as computer systems, mobile phones and personal digital assistants (PDAs). The operating principle of the LCD monitors is based on the effect that different arrangements of liquid crystal molecules result indifferent levels of polarization or refraction of light. Therefore, the amount of light penetration can be controlled by different arrangements of liquid crystal molecules, so as to generate output light with different intensities and different gray-levels of red, green and blue light. A timing controller is generally utilized in an LCD monitor for generating a data signal related to a displayed image and a control signal and a clock signal needed for driving the LCD panel. A source driver of the LCD monitor then generates a driving signal of the LCD panel according to the data signal, the control signal and the clock signal.

In general, a polarity of a voltage signal applied to a liquid crystal material layer needs to be inverted from time to time, to prevent the liquid crystal material from being polarized which leads to permanent damage and prevent from image sticking effect. Generally, methods such as frame inversion, line inversion or dot inversion are used for driving the LCD monitor, and therefore, the source driver needs to repetitively perform charging and discharging so as to provide the driving signal with different polarities. On the other hand, the output of the timing controller may also be switched between logic 1 and logic 0.

During operation, the LCD monitor may generate a common electrode voltage (Vcom), which is related to crosstalk. Crosstalk is a phenomenon by which a certain area of the image affects brightness of a neighboring area in an LCD panel. One of the reasons for crosstalk is poor stability of the common electrode voltage. For an LCD monitor used in a television, the LCD panel mainly displays motion pictures, for which crosstalk is not easy to occur. Hence, most of LCD monitors used in televisions nowadays are not designed with crosstalk elimination. However, for LCD monitors used in smart televisions, the LCD monitors may display more static pictures, and therefore, chances of having crosstalk are significantly increased.

Two methods are mainly applied for solving the crosstalk problem for LCD monitors, one of which is to stabilize the common electrode voltage. However, for LCD monitors with large size, a load of the common electrode voltage is high, such that a feedback compensation control over the common electrode voltage is difficult to be performed.

The other method to solve the crosstalk problem is to change the driving method of the timing controller by special patterns. In the industry, a conventional LCD monitor is capable of switching the driving method by detecting special patterns in the display frame, so as to prevent crosstalk.

Please refer to FIG. 1, which is a schematic diagram of a conventional LCD monitor 10. The LCD monitor 10 includes an LCD panel 100, a timing controller 102 and a driving circuit 104. The LCD panel 100 is used for displaying a frame, composed of two substrates, where an LCD layer is filled in between. The timing controller 102 is used for generating a data signal related to the displayed image and a control signal and a clock signal, i.e. a polarity control signal POL and a latch signal LD, required for driving the LCD panel 100. The timing controller 102 further detects special patterns in the displaying frame of the LCD panel 100. After detecting a special pattern, the timing controller 102 transmits a horizontal dot inversion control signal H2DOT, and changes the driving method of the LCD panel 100 to a horizontal two-dot inversion driving method. The driving circuit 104 includes a plurality of source drivers SD_1-SD_i, which generate respective driving signals in response to signals transmitted from the timing controller 102, for changing the arrangement and the corresponding amount of light penetration of the liquid crystal molecules in the LCD panel 100, to display image data on the LCD panel 100.

Please continue referring FIG. 2, which is a schematic diagram of a conventional source driver 20. The source driver 20, representing the source drivers SD_1-SD_i in FIG. 1, includes a horizontal dot inversion control unit 200 and an output unit 202. When the horizontal dot inversion control unit 200 detects the special patterns in the frame, it generates a horizontal dot inversion control signal H2DOT, so as to switch the driving method of the output unit 202 to the horizontal two-dot inversion driving method. The output unit 202 is coupled to the horizontal dot inversion control unit 200, for adjusting the driving method thereof according to the horizontal dot inversion control signal H2DOT, the polarity control signal POL and latch signal LD.

The conventional LCD monitor 10 is capable of detecting various special patterns and determining whether crosstalk occurs. For example, please refer to FIG. 3A, which is a schematic diagram of a special pattern 300A in a frame 30A. The special pattern 300A is composed of eight bright sub-pixels and seven dark sub-pixels, which are interlacedly arranged. That is, each two bright sub-pixels are with a dark sub-pixel located in between. If the timing controller 102 detects that the special pattern 300A exists in the frame 30A, the timing controller 102 generates horizontal dot inversion control signal H2DOT in order to switch the driving method to the horizontal two-dot inversion driving method. On the other hand, the above-mentioned eight bright sub-pixels and seven dark sub-pixels may be interspersed in a same frame. As shown in FIG. 3B, the special pattern 300B includes eight bright sub-pixels and seven dark sub-pixels interspersed in a frame 30B. Similarly, if the timing controller 102 detects that the special patterns 300B exists in the frame 30B, the timing controller 102 generates the horizontal dot inversion control signal H2DOT in order to switch the driving method to the horizontal two-dot inversion driving method.

However, for large-size LCD monitors, it is hard to design the special patterns for detecting crosstalk in the frame due to larger areas of displaying frame. Take FIG. 3B as an example. If the bright sub-pixels and the dark sub-pixels are separated with each other for a long distance, the timing controller needs to scan through almost the entire frame to detect the special patterns. Thus, it is not easy to detect the special patterns, resulting in a probably decrease of the screen display quality.

SUMMARY OF THE INVENTION

Therefore, the present invention provides an LCD monitor and a driving circuit and a control method thereof capable of timely switching a driving method when the common electrode voltage is too high or too low by detecting a common electrode voltage, to stabilize the common electrode voltage and prevent crosstalk caused by a large fluctuation of the common electrode voltage, and therefore, maintain the display quality.

The present invention discloses a liquid crystal display (LCD) monitor, comprising an LCD panel, for displaying a frame; a timing controller, for generating a polarity control signal and a latch signal; and a driving circuit, comprising a plurality of source drivers, a first reference voltage and a second reference voltage; wherein each source driver of the plurality source drivers comprises a comparison unit, for comparing a common electrode voltage with the first reference voltage and the second reference voltage, to generate a comparison result; an enabling unit, coupled to the comparison unit, for generating an enabling signal according to the comparison result, a source driving signal and a reset signal; a horizontal dot inversion control unit, coupled to the enabling unit, for generating a horizontal dot inversion control signal according to the enabling signal; and a polarity control unit, coupled to the enabling unit, for generating a polarity inversion control signal and the reset signal according to the enabling signal, the polarity control signal and the latch signal; wherein the horizontal dot inversion control signal and the polarity inversion control signal are utilized for deciding a driving method; wherein the first reference voltage is higher than the second reference voltage.

The present invention further discloses a source driver for an LCD monitor, comprising a comparison unit, for comparing a common electrode voltage with the first reference voltage and the second reference voltage, to generate a comparison result; an enabling unit, coupled to the comparison unit, for generating an enabling signal according to the comparison result, a source driving signal and a reset signal; a horizontal dot inversion control unit, coupled to the enabling unit, for generating a horizontal dot inversion control signal according to the enabling signal; and a polarity control unit, coupled to the enabling unit, for generating a polarity inversion control signal and the reset signal according to the enabling signal, the polarity control signal and the latch signal; wherein, the horizontal dot inversion control signal and the polarity inversion control signal are used utilized for deciding a driving method; wherein, the first reference voltage is higher than the second reference voltage.

The present invention further discloses a control method for an LCD monitor, comprising comparing a common electrode voltage with a first reference voltage and a second reference voltage, to generate a comparison result; generating an enabling signal according to the comparison result, a source driving signal and a reset signal; generating a horizontal dot inversion control signal according to the enabling signal; generating a polarity inversion control signal and the reset signal according to the enabling signal, a polarity control signal and a latch signal; and deciding a driving method of the LCD monitor according to the horizontal dot inversion control signal and the polarity inversion control signal; wherein, the first reference voltage is higher than the second reference voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9A is a schematic diagram of a horizontal two-dot inversion driving method according to an embodiment of the present invention.

FIG. 9B is a schematic diagram of a horizontal two-dot inversion driving method combining a vertical (1+N)-dot (N=2) inversion driving method according to an embodiment of the present invention.

FIG. 9C is a schematic diagram of a horizontal two-dot inversion driving method combining a vertical N-dot (N=3) inversion driving method according to an embodiment of the present invention.

FIG. 9D is a schematic diagram of a horizontal two-dot inversion driving method combining a vertical (N+M)-dot (N=2 and M=3) inversion driving method according to an embodiment of the present invention.

DETAILED DESCRIPTION

Figure 1:
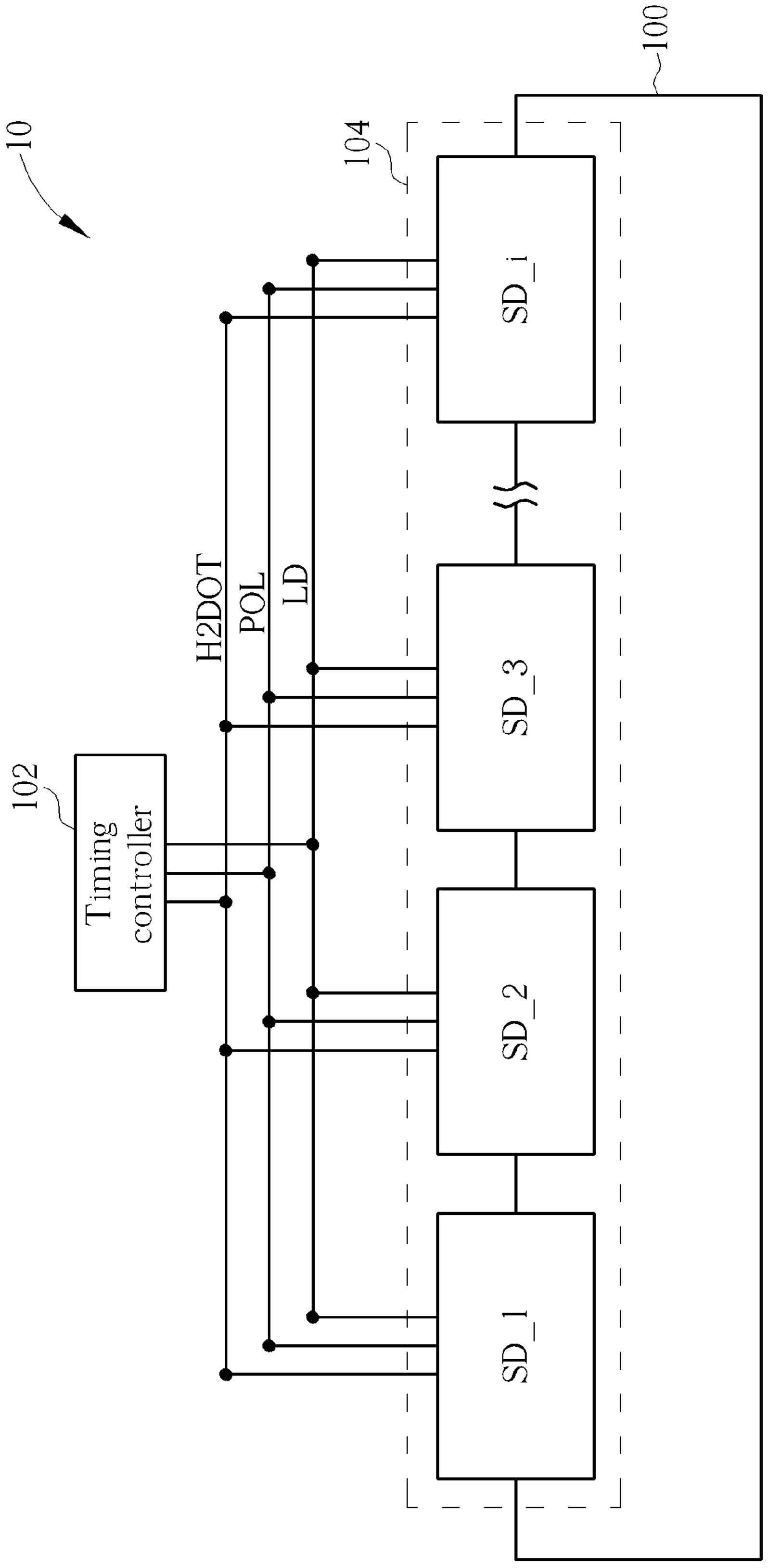
FIG. 1 is a schematic diagram of a conventional liquid crystal display monitor.
Figure 2:
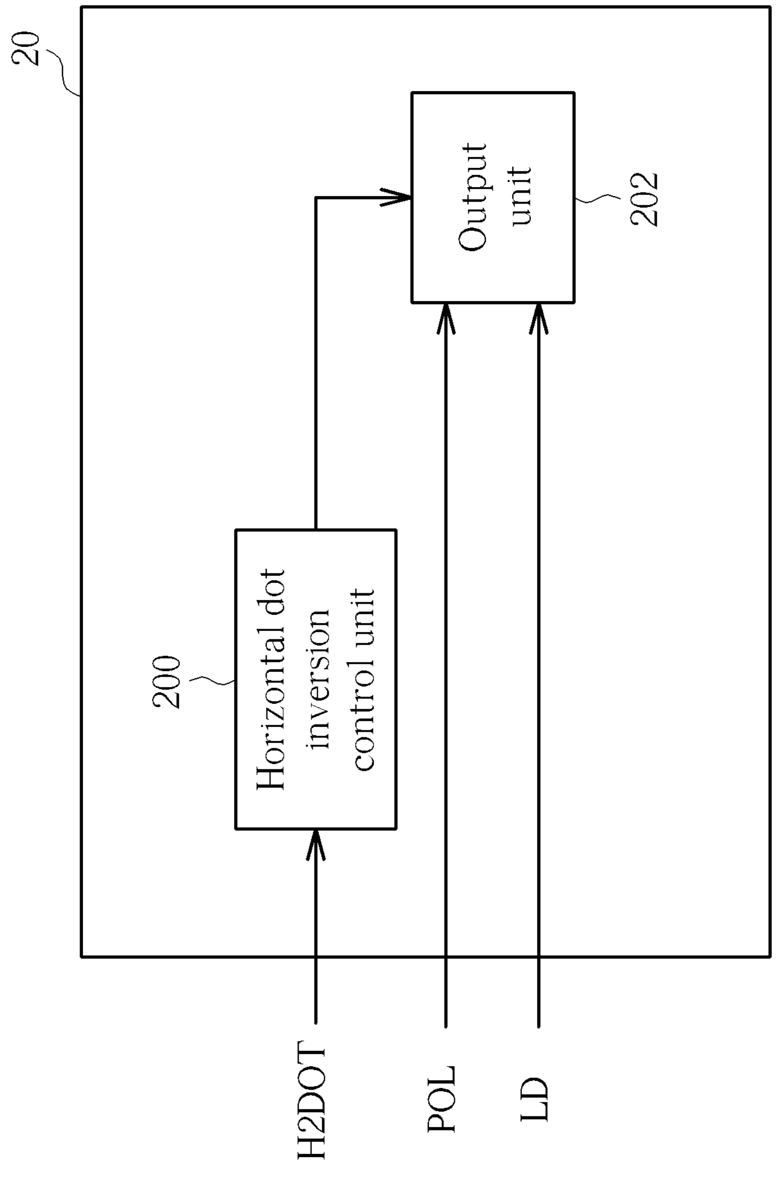
FIG. 2 is a schematic diagram of a conventional source driver.
Figure 3A:
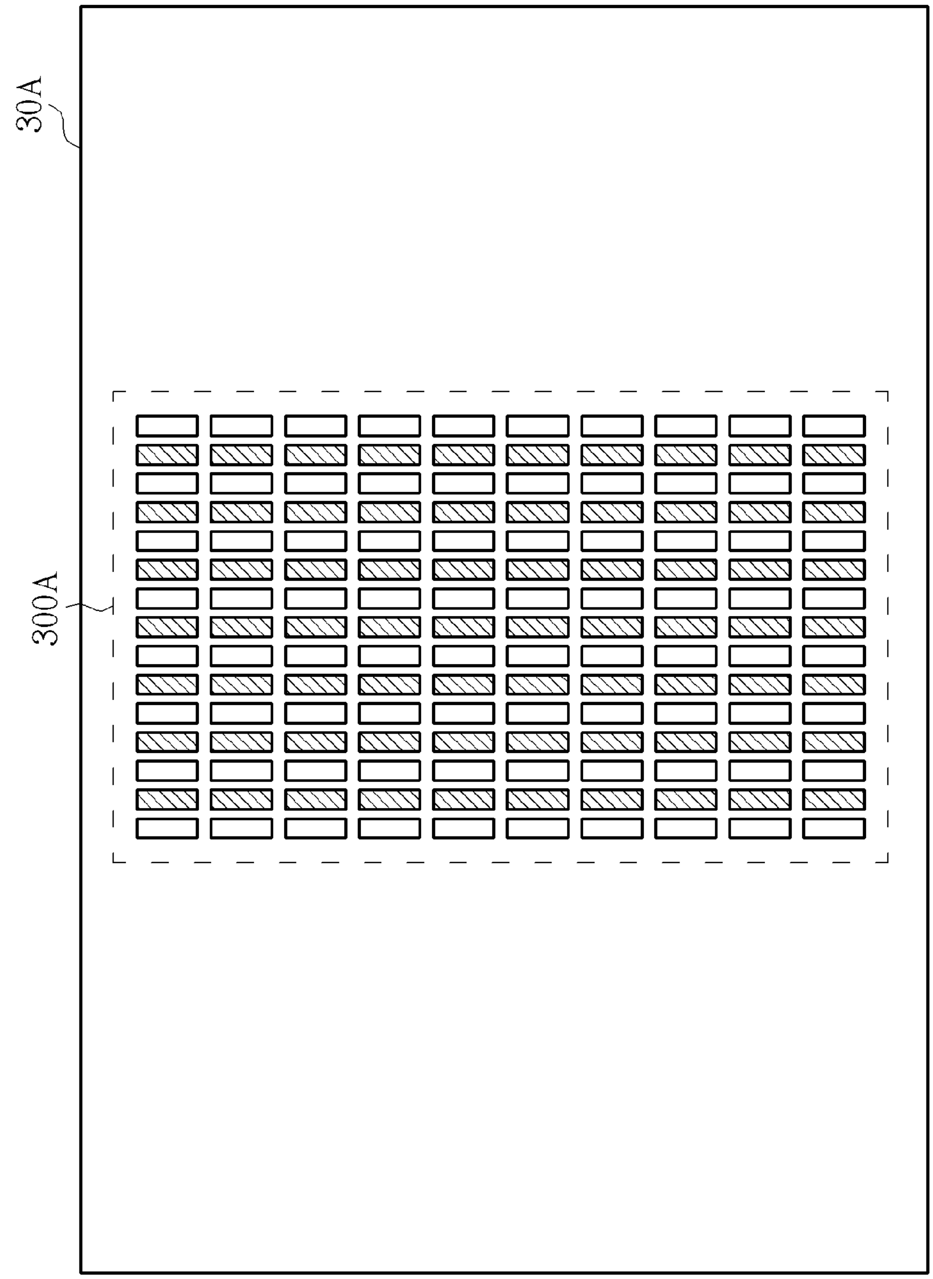
FIG. 3A is a schematic diagram of a special pattern in a frame.
Figure 3B:
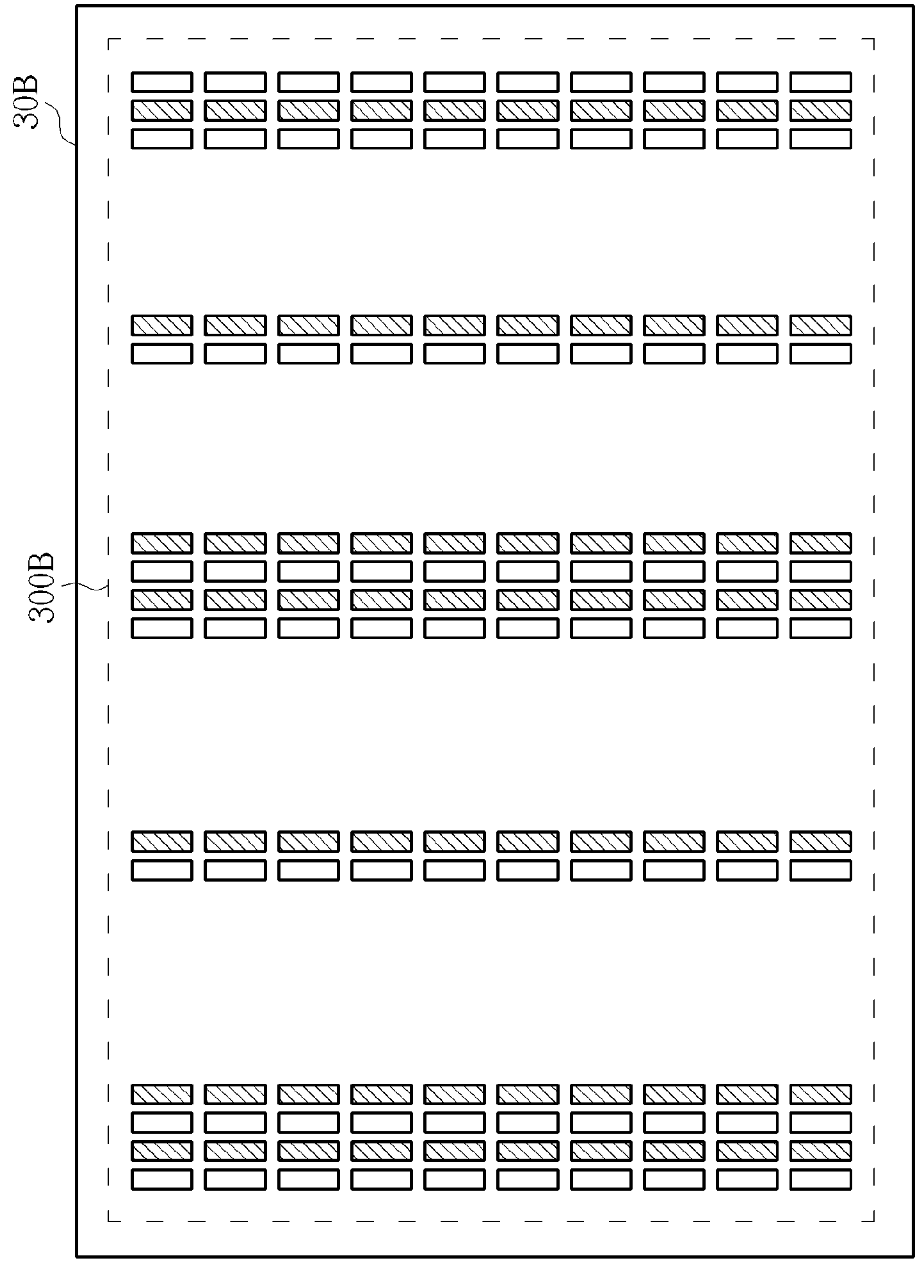
FIG. 3B is a schematic diagram of a special pattern in a frame.
Figure 4:
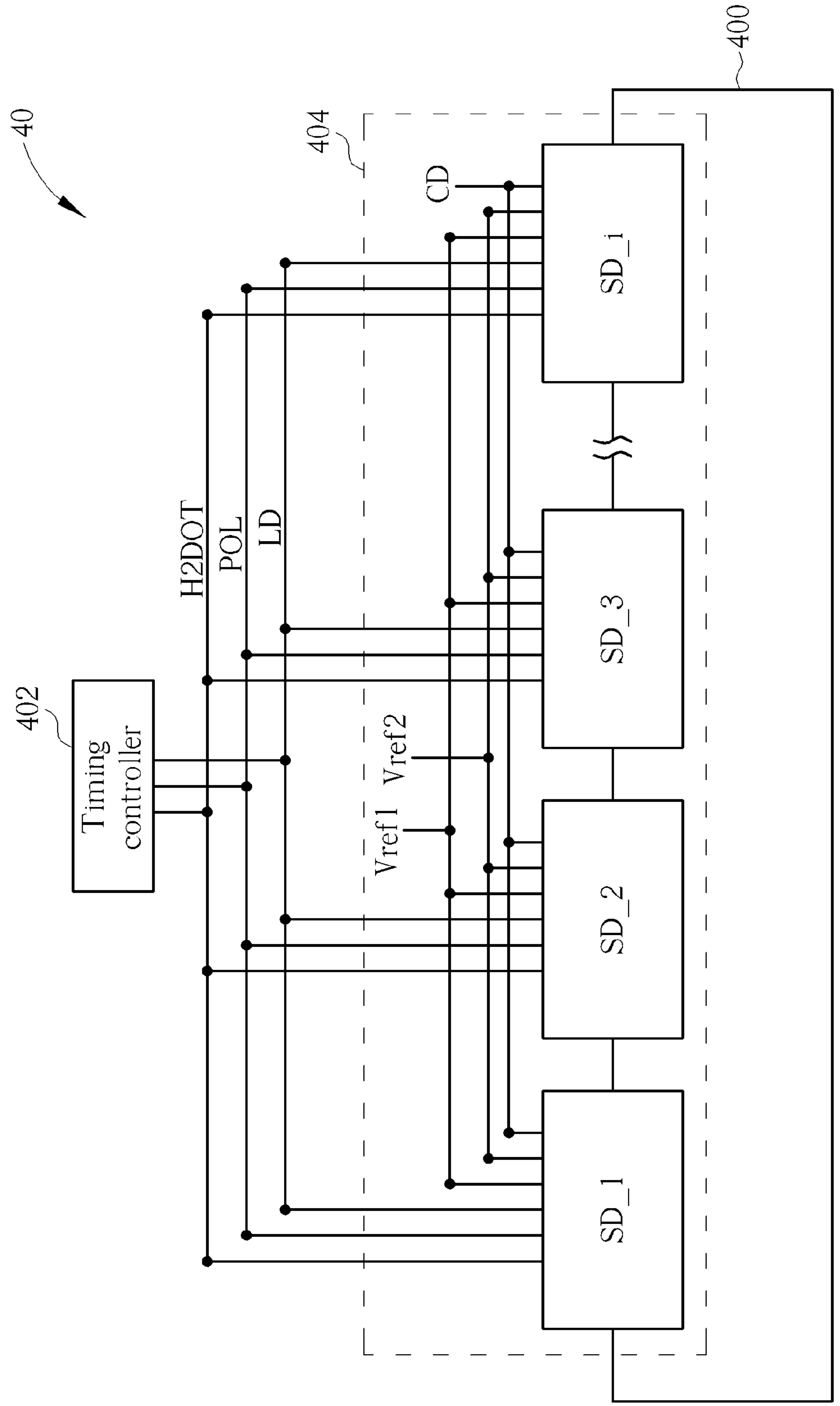
FIG. 4 is a schematic diagram of a liquid crystal display monitor according to an embodiment of the present invention.

Please refer to FIG. 4, which is a schematic diagram of an LCD monitor 40 according to an embodiment of the present invention. The LCD monitor 40 includes an LCD panel 400, a timing controller 402 and a driving circuit 404. Functions of the LCD panel 400 and the timing controller 402 are the same with those of the conventional LCD panel 100 and the conventional timing controller 102, respectively, and hence are not narrated hereinafter. The driving circuit 404 includes a plurality of source drivers SD_1-SD_i, and reference voltage sources for generating reference voltages Vref1 and Vref2. Each of the source drivers SD 1-SD_i is used for detecting a common electrode voltage VCOM of the LCD panel 400, and comparing the common electrode voltage VCOM with the reference voltages Vref1, Vref2, to decide whether to change a driving method or not. Each of the source drivers SD_1-SD_i outputs or receives a source driving signal CD, to notify itself and a system of whether to change the driving method.

Figure 5:
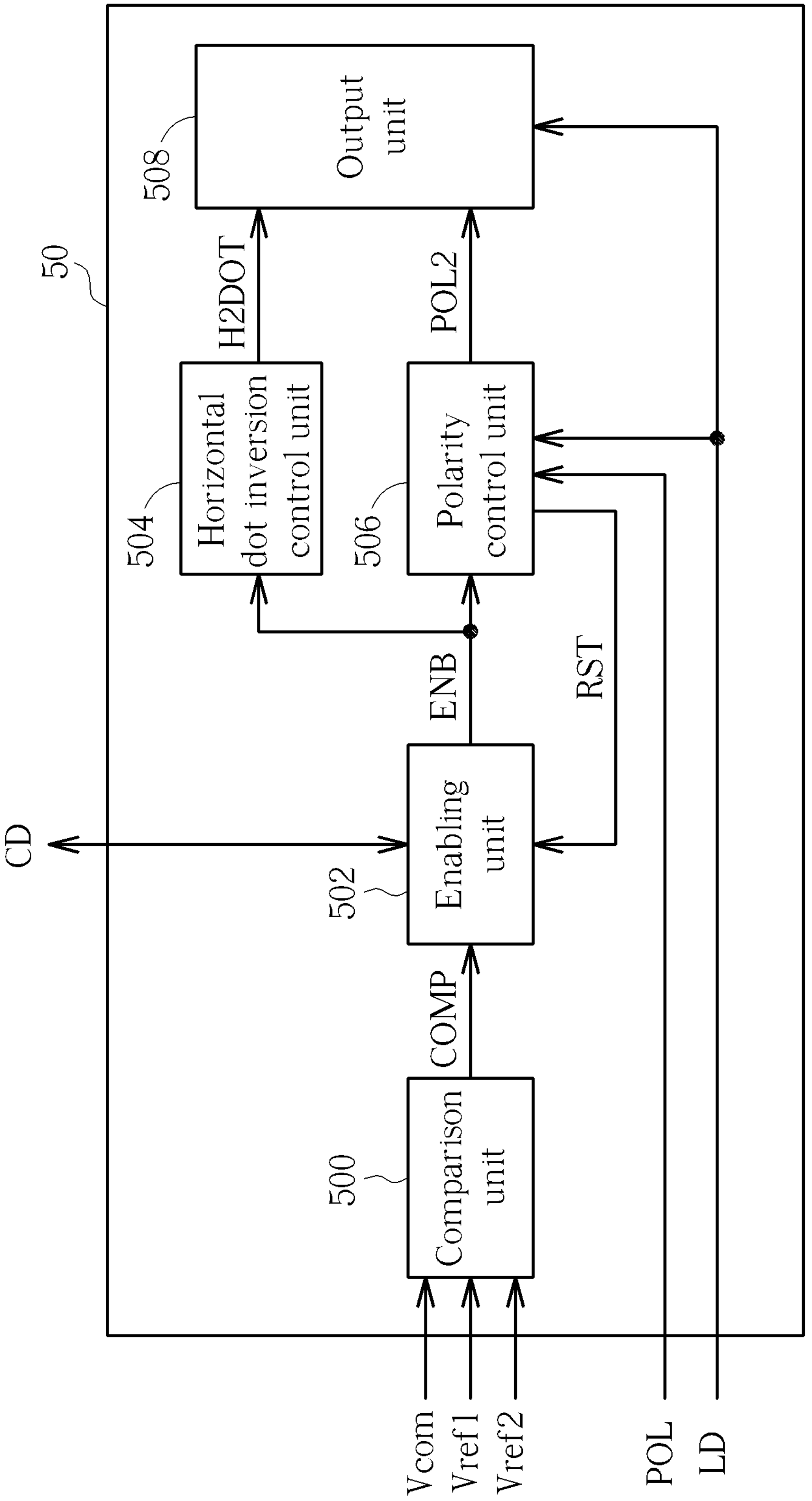
FIG. 5 is a schematic diagram of a source driver according to an embodiment of the present invention.

Please continue referring to FIG. 5, which is a schematic diagram of a source driver 50 according to an embodiment of the present invention. The source driver 50 represents the source drivers SD_1-SD_i in FIG. 4, and includes a comparison unit 500, an enabling unit 502, a horizontal dot inversion control unit 504, a polarity control unit 506 and an output unit 508. The comparison unit 500 compares the common electrode voltage VCOM and the reference voltages Vref1, Vref2, to generate a comparison result COMP, where the reference voltage Vref1 is higher than the reference voltage Vref2. The enabling unit 502 generates an enabling signal ENB according to the comparison result COMP, a reset signal RST and the source driving signal CD. The horizontal dot inversion control unit 504 is coupled to the enabling unit 502, for generating a horizontal dot inversion control signal H2DOT according to the enabling signal ENB, so as to control an output state of the output unit 508. The polarity control unit 506 is coupled to the enabling unit 502, for generating a polarity inversion control signal POL2 and the reset signal RST according to the enabling signal ENB, the polarity control signal POL and the latch signal LD, to respectively control the output state of the output unit 508 and the enabling signal ENB of the enabling unit 502. The output unit 508 is coupled to the horizontal dot inversion control unit 504 and the polarity control unit 506, for adjusting the output state of the output unit 508 according to the horizontal dot inversion control signal H2DOT, the polarity inversion control signal POL2 and the latch signal LD.

Figure 6:
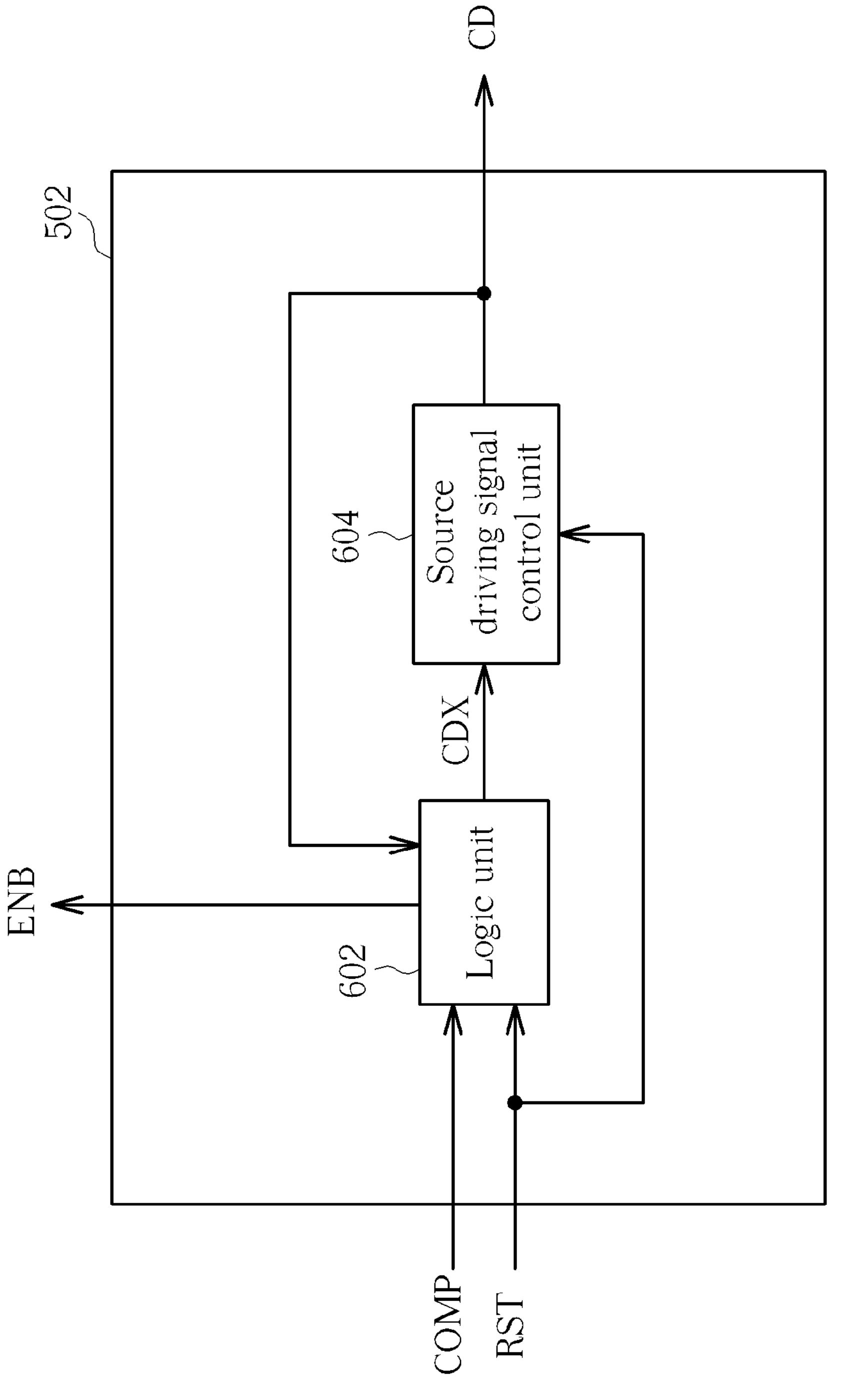
FIG. 6 is a schematic diagram of the enabling unit shown in FIG. 5.

Please refer to FIG. 6 for a possible embodiment of the enabling unit 502 in FIG. 5. In FIG. 6, the enabling unit 502 includes a logic unit 602 and a source driving signal control unit 604. The source driving signal control unit 604 is used for providing a source driving signal. The logic unit 602 is used for logically computing the comparison result COMP, the source driving signal CD and the reset signal RST, to generate the enabling signal ENB and a logic signal CDX. The source driving signal control unit 604 is coupled to the logic unit 602, for controlling states of the source driving signal CD to logic high or logic low according to the logic signal CDX generated by the logic unit 602.

Figure 7:
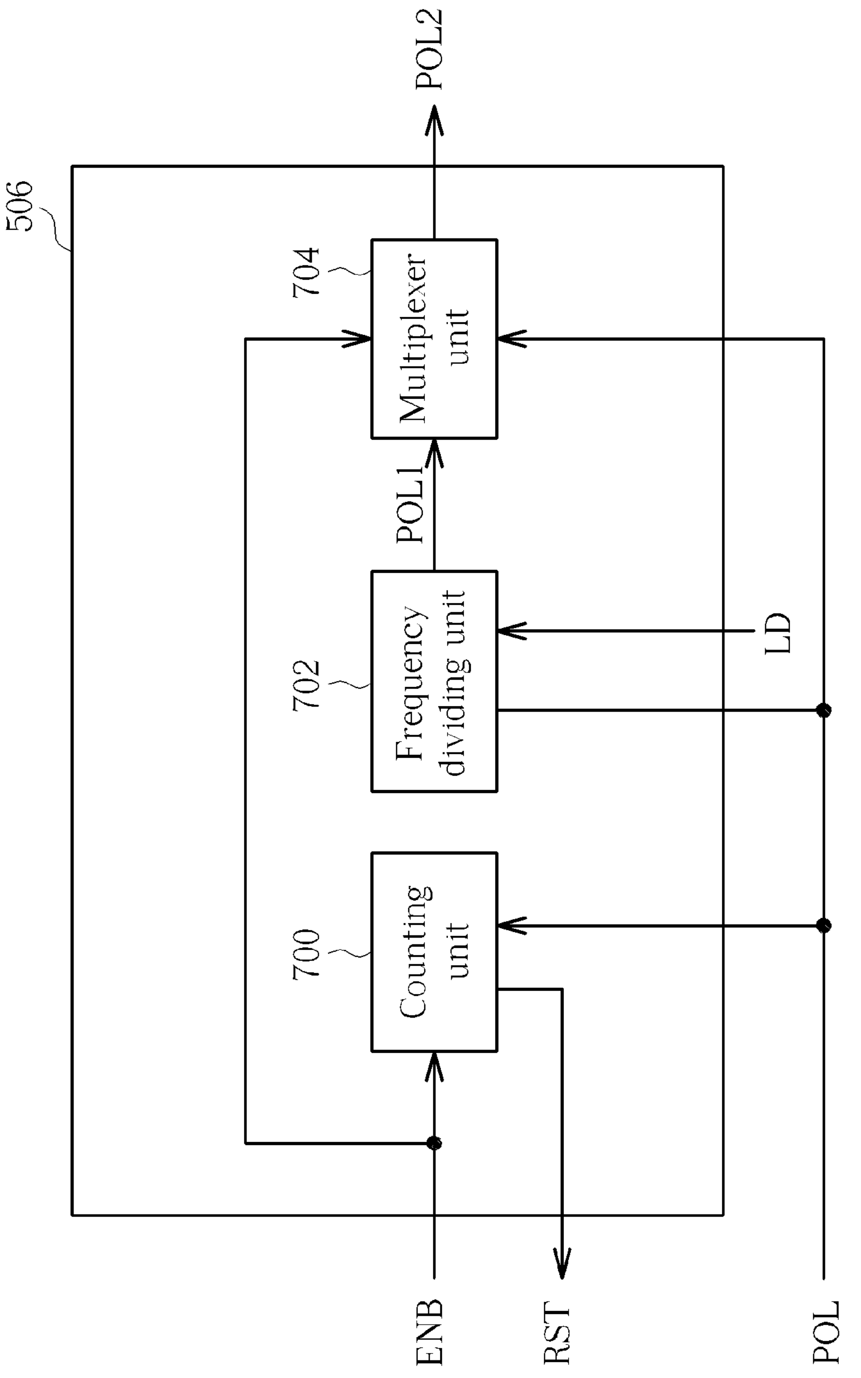
FIG. 7 is a schematic diagram the polarity control unit shown in FIG. 5.

Please refer to FIG. 7 for a possible embodiment of the polarity control unit 506 in FIG. 5. In FIG. 7, the polarity control unit 506 includes a counting unit 700, a frequency dividing unit 702 and a multiplexer unit 704. The counting unit 700 is used for counting a count value according to the enabling signal ENB and the polarity inversion control signal POL, and switching the driving method to a normal column inversion driving method and resetting the count value when the count value reaches a predefined value. The frequency dividing unit 702 divides frequencies of the polarity control signal POL and the latch signal LD, to generate a frequency dividing signal POL1. The multiplexer unit 704 is coupled to the frequency dividing unit 702, for multiplexing the polarity control signal POL and the frequency dividing signal POL1 according to the enabling signal ENB, to generate the polarity inversion control signal POL2.

Figure 8:
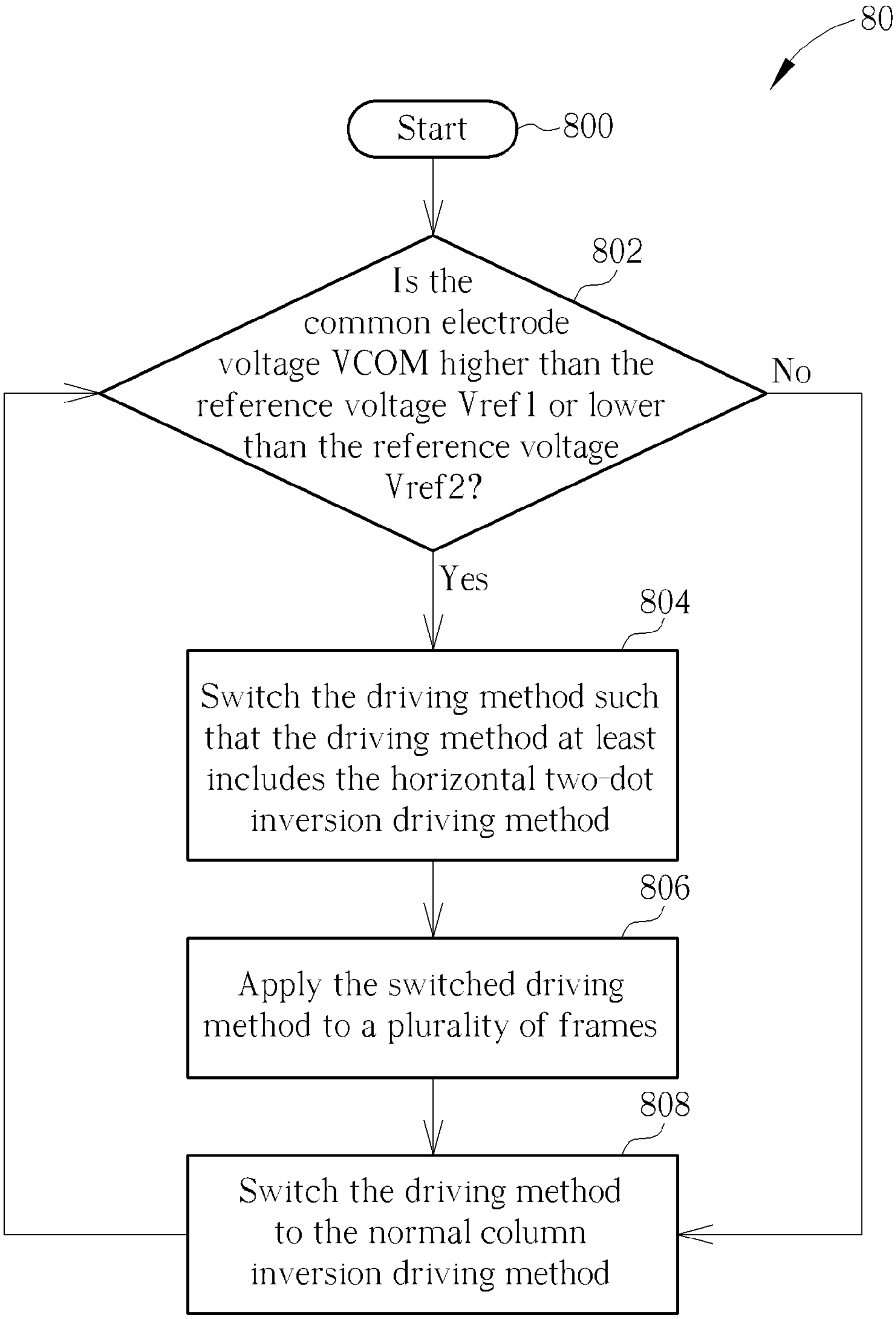
FIG. 8 is a flow diagram of a driving method switching flow according to an embodiment of the present invention.

Please refer to FIG. 8, which is a flow diagram of a driving method switching process 80 according to an embodiment of the present invention. The driving method switching process 80 is used for detecting whether the common electrode voltage VCOM is too high or too low. The driving method switching process 80 includes the following steps:

Step 800: Start.

Step 802: Determine whether the common electrode voltage VCOM is higher than the reference voltage Vref1 or lower than the reference voltage Vref2. If yes, perform Step 804; otherwise, perform Step 808.

Step 804: Switch the driving method such that the driving method at least includes the horizontal two-dot inversion driving method.

Step 806: Apply the switched driving method to a plurality of frames.

Step 808: Switch the driving method to the normal column inversion driving method.

According to the driving method switching process 80, first, the comparison unit 500 detects the common electrode voltage VCOM, and determines whether the common electrode voltage VCOM is higher than the reference voltage Vref1 or lower than the reference voltage Vref2. If the common electrode voltage VCOM is higher than the reference voltage Vref1, or the common electrode voltage VCOM is lower than the reference voltage Vref2, the driving method is switched to a driving method which at least includes the horizontal two-dot inversion driving method. Preferably, the switched driving method is the horizontal two-dot inversion driving method or the horizontal two-dot inversion driving method combining a vertical inversion driving method. In the present invention, the vertical inversion driving method includes a vertical N-dot inversion driving method, a vertical (1+N)-dot inversion driving method and a vertical (N+M)-dot inversion driving method, where M is not smaller than 3 and N is not smaller than 2. The horizontal two-dot inversion driving method is controlled and generated by the horizontal dot inversion control unit 504, and the vertical inversion driving method is controlled and generated by the polarity control unit 506. That is, the horizontal dot inversion control signal H2DOT generated by the horizontal dot inversion control unit 504 and the polarity inversion control signal POL2 generated by the polarity control unit 506 are utilized for deciding the driving method to be the horizontal two-dot inversion driving method, the horizontal two-dot inversion driving method combining the vertical N-dot inversion driving method, the horizontal two-dot inversion driving method combining the vertical (1+N)-dot inversion driving method or the horizontal two-dot inversion driving method combining the vertical (N+M)-dot inversion driving method. The output unit 508 controls the LCD panel 400 according to the horizontal dot inversion control signal H2DOT and the polarity inversion control signal POL2, such that the LCD panel 400 utilizes the switched driving method after several following frames. After the above steps are completed, the driving method is switched back to the original driving method, i.e. the normal column inversion driving method, and detection of the common electrode voltage VCOM is then restarted.

On the contrary, if the common electrode voltage VCOM is between the reference voltages Vref1 and Vref2, the driving method is maintained as the normal column inversion driving method, and the detection to the common electrode voltage VCOM is continued.

Please refer to FIG. 9A to 9D, which are schematic diagrams of the horizontal two-dot inversion driving method, the horizontal two-dot inversion driving method combining the vertical (1+N)-dot (N=2) inversion driving method, the horizontal two-dot inversion driving method combining the vertical N-dot (N=3) inversion driving method and the horizontal two-dot inversion driving method combining the vertical (N+M)-dot (N=2 and M=3) inversion driving method, together with a zigzag pixel (Flip-pixel)

panel, respectively, according to embodiments of the present invention. One of the above driving methods can be selected in the LCD monitor 40. Please note that, FIG. 9A to 9D are examples of driving methods, but are not limited thereto. The present invention is to switch the driving method after the common electrode voltage is higher than the reference voltage Vref1 or lower than the reference voltage Vref2 is detected, so as to reduce variations of the common electrode voltage and thereby eliminate crosstalk. Therefore, methods based on detecting the common electrode voltage for switching the driving method as the present invention are within the scope of the present invention.

Figure 10:
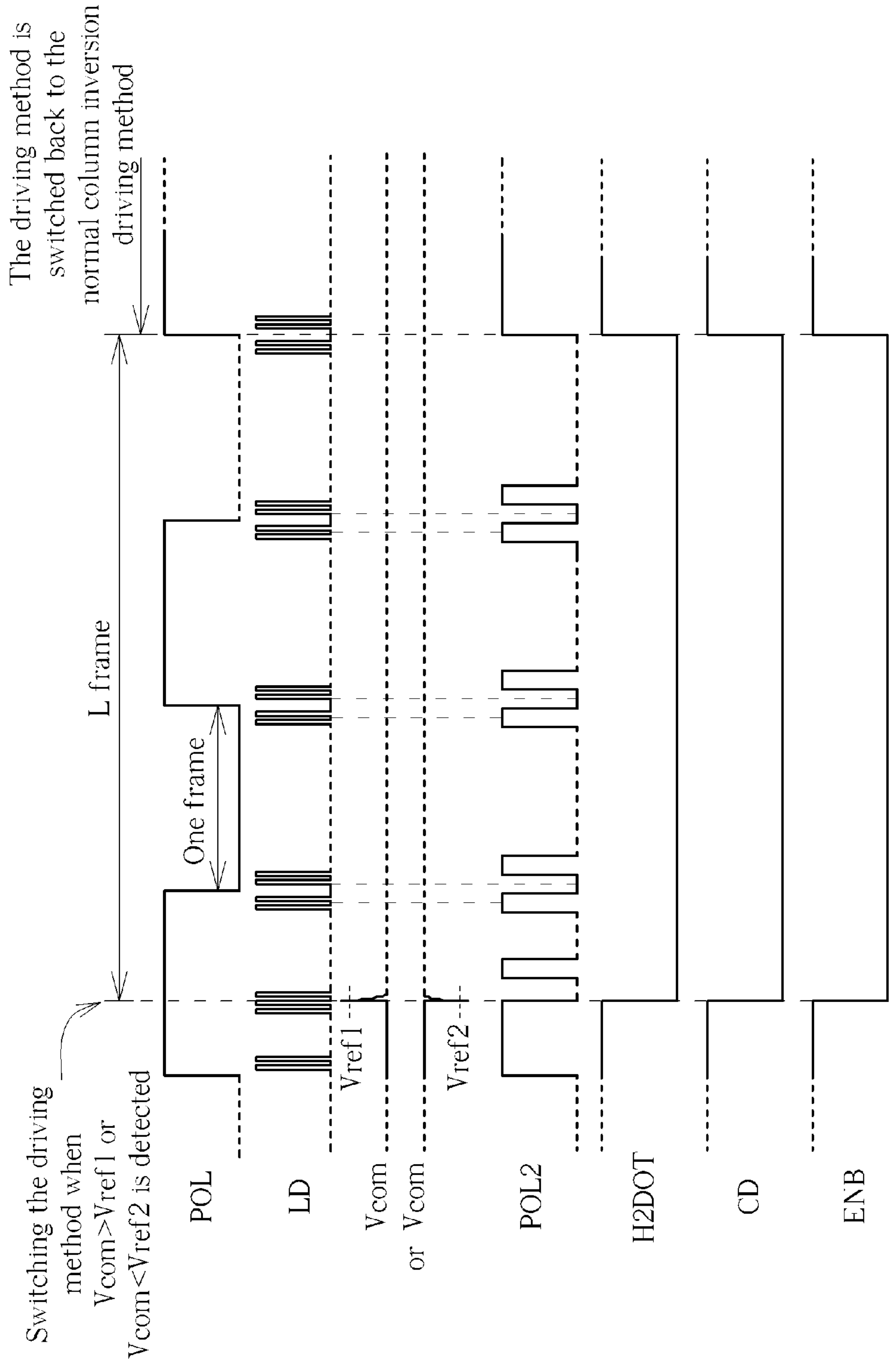
FIG. 10 is a timing diagram of related signals in the source driver shown in FIG. 5.

Please refer to FIG. 10, which is a timing diagram of related signals of the source driver 50 in FIG. 5. As shown in FIG. 10, after the common electrode voltage VCOM is detected to be higher than the reference voltage Vref1 or lower than the reference voltage Vref2, the enabling unit 502 switches the source driving signal CD to logic low, and the enabling signal ENB is therefore switched to logic low. The horizontal dot inversion control signal H2DOT is switched to logic low according to the enabling signal ENB, which means that the driving method is switched to the horizontal two-dot inversion driving method. In FIG. 10, the vertical two-dot inversion driving method is applied as an example. According to the latch signal LD, the polarity control signal POL and the enabling signal ENB in FIG. 10, after the driving method is switched, the polarity inversion control signal POL2 shows a waveform with two LD pulses within a period when the polarity control signal POL maintains in a same voltage level, for indicating the driving method includes the vertical two-dot inversion driving method. Therefore, in FIG. 10, the switched driving method is the horizontal two-dot inversion driving method combining the vertical two-dot inversion driving method. After several (e.g., L) pictures are displayed, the enabling signal ENB is back to logic high. Accordingly, the horizontal dot inversion control signal H2DOT and the polarity inversion control signal POL2 return to logic high. The driving method is then switched back to the normal column inversion driving method, and the detection of whether the common electrode voltage VCOM is higher than the reference voltage Vref1 or lower than the reference voltage Vref2 is restart.

Figure 11:
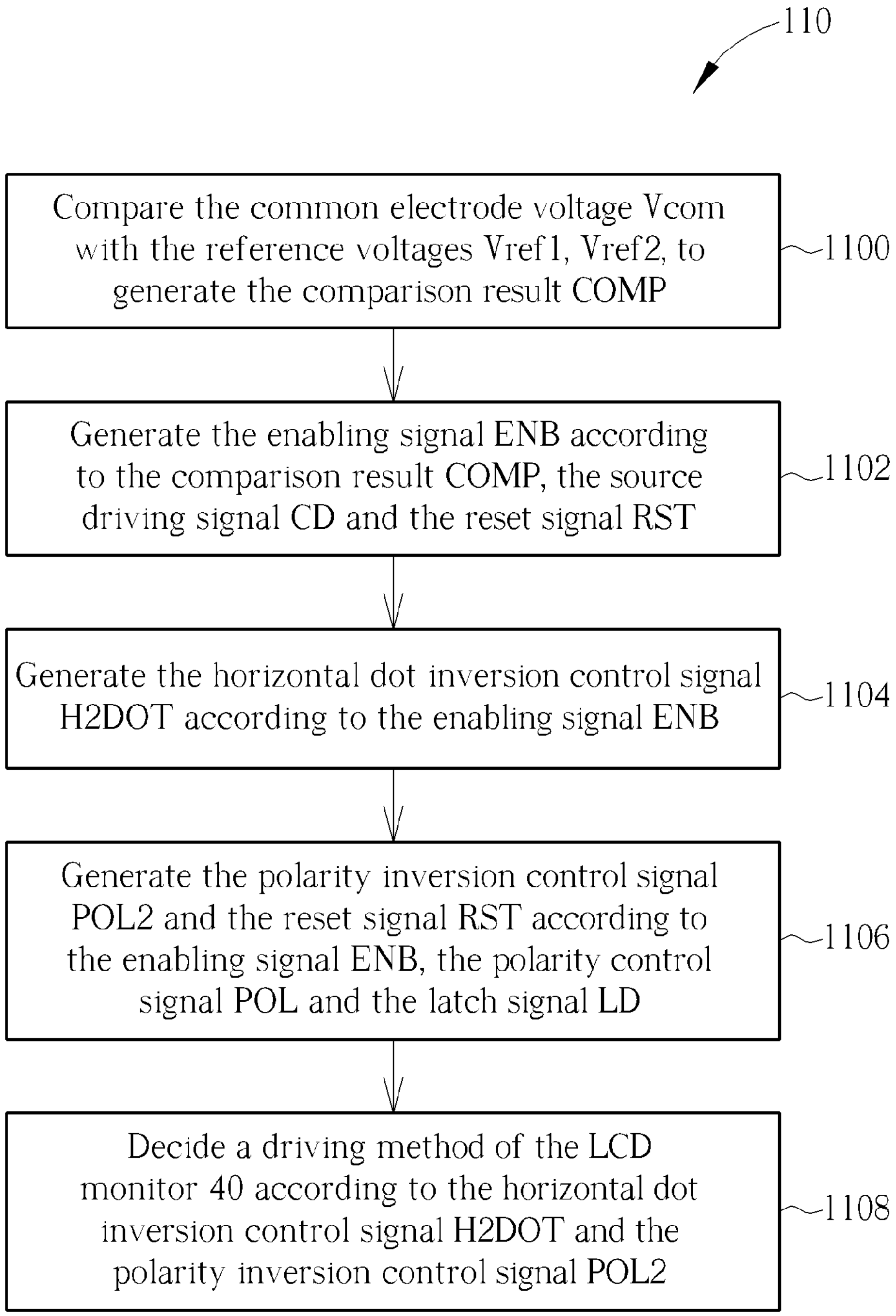
FIG. 11 is a schematic diagram of a controlling process according to an embodiment of the present invention.

Operations of how the source drivers SD_1-SD_i switch the driving method in the above-mentioned LCD monitor 40 can be summarized into a control process 110 as shown in FIG. 11. The control process 110 includes the following steps:

Step 1100: Compare the common electrode voltage Vcom with the reference voltages Vref1, Vref2, to generate the comparison result COMP.

Step 1102: Generate the enabling signal ENB according to the comparison result COMP, the source driving signal CD and the reset signal RST.

Step 1104: Generate the horizontal dot inversion control signal H2DOT according to the enabling signal ENB.

Step 1106: Generate the polarity inversion control signal POL2 and the reset signal RST according to the enabling signal ENB, the polarity control signal POL and the latch signal LD.

Step 1108: Decide a driving method of the LCD monitor 40 according to the horizontal dot inversion control signal H2DOT and the polarity inversion control signal POL2.

By detecting arrangement of special patterns, the conventional LCD monitor switches the driving method when special patterns exist and are detected in the frame, to eliminate crosstalk. However, when the conventional method, which utilizes detections of the special patterns, is applied to a large size LCD monitor, it would be difficult to detect the special patterns causing crosstalk because of large area of the display frame. In comparison, by detecting the common electrode voltage, the LCD monitor of the present invention is capable of timely switching the driving method when the common electrode voltage is too high or too low, so as to stabilize the common electrode voltage and prevent crosstalk due to a large variation of the common electrode voltage. The way of detecting the common electrode voltage in the present invention does not affected by a size of the LCD monitor, and therefore, can be applied to large-size LCD monitors.

To sum up, by detecting the common electrode voltage, the LCD monitor of the present invention timely switches the driving method when detecting the common electrode voltage is too high or too low, so as to stabilize the common electrode voltage and prevent crosstalk caused by a large fluctuation of the common electrode voltage, and therefore, maintain the display quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD) monitor, comprising:

an LCD panel, for displaying a frame;

a timing controller, for generating a polarity control signal and a latch signal; and a driving circuit, comprising a plurality of source drivers, a first reference voltage and a second reference voltage;

wherein each source driver of the plurality source drivers comprises:

a comparison circuit, for comparing a common electrode voltage with the first reference voltage and the second reference voltage, to generate a comparison result;

an enabling circuit, coupled to the comparison circuit, for generating an enabling signal according to the comparison result, a source driving signal and a reset signal;

a horizontal dot inversion control circuit, coupled to the enabling circuit, for generating a horizontal dot inversion control signal according to the enabling signal; and a polarity control circuit, coupled to the enabling circuit, for generating a polarity inversion control signal and the reset signal according to the enabling signal, the polarity control signal and the latch signal;

wherein the driving circuit is configured to switch between a plurality of inversion driving methods according to a value of the common electrode voltage, and a driving method is selected from the plurality of inversion driving methods when the horizontal dot inversion control signal and the polarity inversion control signal are supplied to control the LCD panel according to the comparison result;

wherein the first reference voltage is higher than the second reference voltage.

2. The LCD monitor of claim 1, wherein the driving method is switched to a first inversion driving method when the common electrode voltage is higher than the first reference voltage or lower than the second reference voltage.

3. The LCD monitor of claim 2, wherein the first inversion driving method is a horizontal two-dot inversion driving method.

4. The LCD monitor of claim 2, wherein the first inversion driving method is a horizontal two-dot inversion driving method combining a vertical N-dot inversion driving method, where N is not smaller than 2.

5. The LCD monitor of claim 2, wherein the first inversion driving method is a horizontal two-dot inversion driving method combining a vertical (1+N)-dot inversion driving method, where N is not smaller than 2.

6. The LCD monitor of claim 2, wherein the first inversion driving method is a horizontal two-dot inversion driving method combining a vertical (N+M)-dot inversion driving method, where M is not smaller than 3 and N is not smaller than 2.

7. The LCD monitor of claim 1, wherein the driving method is switched to a second inversion driving method when the common electrode voltage is lower than the first reference voltage and higher than the second reference voltage.

8. The LCD monitor of claim 7, wherein the second inversion driving method is a normal column inversion driving method.

9. The LCD monitor of claim 1, wherein the enabling circuit comprises:

a logic unit, for logically computing the comparison result, the source driving signal and the reset signal, to generate the enabling signal and a logic signal; and a source driving signal control unit, coupled to the logic unit, for controlling the source driving signal to logic high or logic low according to the logic signal.

10. The LCD monitor of claim 1, wherein the polarity control circuit comprises:

a counting unit, for counting a count value according to the enabling signal and the polarity inversion control signal, and switching the driving method to a normal column inversion driving method and resetting the count value when the count value reaches a predefined value;

a frequency dividing unit, for dividing frequencies of the polarity control signal and the latch signal, to generate a frequency dividing signal; and a multiplexer unit, coupled to the frequency dividing unit, for multiplexing the enabling signal, the polarity control signal and the frequency dividing signal, to generate the polarity inversion control signal.

11. The LCD monitor of claim 1, further comprising:

an output unit, coupled to the horizontal dot inversion control circuit and the polarity control circuit, for outputting a frame signal according to the driving method.

12. A source driver for a liquid crystal display (LCD) monitor, comprising:

a comparison circuit, for comparing a common electrode voltage with the first reference voltage and the second reference voltage, to generate a comparison result;

an enabling circuit, coupled to the comparison circuit, for generating an enabling signal according to the comparison result, a source driving signal and a reset signal;

a horizontal dot inversion control circuit, coupled to the enabling circuit, for generating a horizontal dot inversion control signal according to the enabling signal; and a polarity control circuit, coupled to the enabling circuit, for generating a polarity inversion control signal and the reset signal according to the enabling signal, the polarity control signal and the latch signal;

wherein the driving circuit is configured to switch between a plurality of inversion driving methods according to a value of the common electrode voltage, and a driving method is selected from the plurality of inversion driving methods when the horizontal dot inversion control signal and the polarity inversion control signal are supplied to control the LCD panel according to the comparison result;

wherein the first reference voltage is higher than the second reference voltage.

13. The driving circuit of claim 12, wherein the driving method is switched to a first inversion driving method when the common electrode voltage is higher than the first reference voltage or lower than the second reference voltage.

14. The driving circuit of claim 13, wherein the first inversion driving method is a horizontal two-dot inversion driving method.

15. The driving circuit of claim 13, wherein the first inversion driving method is a horizontal two-dot inversion driving method combining a vertical N-dot inversion driving method, where N is not smaller than 2.

16. The driving circuit of claim 13, wherein the first inversion driving method is a horizontal two-dot inversion driving method combining a vertical (1+N)-dot inversion driving method, where N is not smaller than 2.

17. The driving circuit of claim 13, wherein the first inversion driving method is a horizontal two-dot inversion driving method combining a vertical (N+M)-dot inversion driving method, where M is not smaller than 3 and N is not smaller than 2.

18. The driving circuit of claim 12, wherein the driving method is switched to a second inversion driving method when the common electrode voltage is lower than the first reference voltage and higher than the second reference voltage.

19. The driving circuit of claim 18, wherein the second inversion driving method is a normal column inversion driving method.

20. The driving circuit of claim 12, wherein the enabling circuit comprises:

a logic unit, for logically computing the comparison result, the source driving signal and the reset signal, to generate the enabling signal and a logic signal; and a source driving signal control unit, coupled to the logic unit, for controlling the source driving signal to logic high or logic low according to the logic signal.

21. The driving circuit of claim 12, wherein the polarity control circuit comprises:

a counting unit, for counting a count value according to the enabling signal and the polarity inversion control signal, and switching the driving method to a normal column inversion driving method and resetting the count value when the count value reaches a predefined value;

a frequency dividing unit, for dividing frequencies of the polarity control signal and the latch signal, to generate a frequency dividing signal; and a multiplexer unit, coupled to the frequency dividing unit, for multiplexing the enabling signal, the polarity control signal and the frequency dividing signal, to generate the polarity inversion control signal.

22. The driving circuit of claim 12, further comprising:

an output unit, coupled to the horizontal dot inversion control circuit and the polarity control circuit, for outputting a frame signal according to the driving method.

23. The driving circuit of claim 12, wherein the polarity control signal and the latch signal are generated from a timing controller.

24. A control method for a liquid crystal display (LCD) monitor, comprising:

comparing a common electrode voltage with a first reference voltage and a second reference voltage, to generate a comparison result;

generating an enabling signal according to the comparison result, a source driving signal and a reset signal;

generating a horizontal dot inversion control signal according to the enabling signal;

generating a polarity inversion control signal and the reset signal according to the enabling signal, a polarity control signal and a latch signal; and selecting a driving method of the LCD monitor from a plurality of inversion driving methods when the horizontal dot inversion control signal and the polarity inversion control signal are supplied to control the LCD panel according to the comparison result, wherein the driving method of the LCD monitor is switched between the plurality of inversion driving methods according to a value of the common electrode voltage;

wherein the first reference voltage is higher than the second reference voltage.

25. The control method of claim 24, wherein the driving method is switched to a first inversion driving method when the common electrode voltage is higher than the first reference voltage or lower than the second reference voltage.

26. The control method of claim 25, wherein the first inversion driving method is a horizontal two-dot inversion driving method.

27. The control method of claim 25, wherein the first inversion driving method is a horizontal two-dot inversion driving method combining a vertical N-dot inversion driving method, where N is not smaller than 2.

28. The control method of claim 25, wherein the first inversion driving method is a horizontal two-dot inversion driving method combining a vertical (1+N)-dot inversion driving method, where N is not smaller than 2.

29. The control method of claim 25, wherein the first inversion driving method is a horizontal two-dot inversion driving method combining a vertical (N+M)-dot inversion driving method, where M is not smaller than 3 and N is not smaller than 2.

30. The control method of claim 24, wherein the driving method is switched to a second inversion driving method when the common electrode voltage is lower than the first reference voltage and higher than the second reference voltage.

31. The control method of claim 30, wherein the second inversion driving method is a normal column inversion driving method.

32. The control method of claim 24, further comprising:

counting a count value according to the enabling signal and the polarity control signal, and switching the driving method to a normal column inversion driving method and resetting the count value when the count value reaches a predefined value;

dividing frequencies of the polarity control signal and the latch signal, to generate a frequency dividing signal; and multiplexing the enabling signal, the polarity control signal and the frequency dividing signal, to generate the polarity inversion control signal.

33. The control method of claim 24, further comprising outputting a frame signal according to the driving method.

34. The control method of claim 24, wherein the polarity control signal and the latch signal are generated from a timing controller.

* * * * *